(12) United States Patent
McCune et al.

(10) Patent No.: US 10,107,231 B2
(45) Date of Patent: Oct. 23, 2018

(54) GAS TURBINE ENGINE WITH GEARED ARCHITECTURE

(71) Applicant: UNITED TECHNOLOGIES CORPORATION, Hartford, CT (US)

(72) Inventors: Michael E. McCune, Colchester, CT (US); Lawrence E. Portlock, Bethany, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 428 days.

(21) Appl. No.: 14/753,048

(22) Filed: Jun. 29, 2015

(65) Prior Publication Data

US 2015/0300197 A1     Oct. 22, 2015

Related U.S. Application Data

(63) Continuation-in-part of application No. 13/346,120, filed on Jan. 9, 2012, now abandoned, which is a
(Continued)

(51) Int. Cl.
*F16H 57/08* (2006.01)
*F02K 3/06* (2006.01)
(Continued)

(52) U.S. Cl.
CPC .................. *F02K 3/06* (2013.01); *F02C 7/36* (2013.01); *F05D 2220/323* (2013.01);
(Continued)

(58) Field of Classification Search
CPC ..................................... F02K 3/06; F02C 7/36
See application file for complete search history.

(56) References Cited

U.S. PATENT DOCUMENTS

| 2,288,792 | A | 7/1942 | Daniels |
| 2,684,591 | A | 7/1954 | Lundquist |

(Continued)

FOREIGN PATENT DOCUMENTS

| CN | 1952435 | 4/2007 |
| EP | 1114949 | 7/2001 |

(Continued)

OTHER PUBLICATIONS

NASA Conference Publication. Quiet, powered-lift propulsion. Cleveland, Ohio. Nov. 14-15, 1978.
(Continued)

*Primary Examiner* — Derek D Knight
(74) *Attorney, Agent, or Firm* — Carlson, Gaskey & Olds, P.C.

(57) ABSTRACT

A geared architecture for a gas turbine engine comprises a fan shaft and a fan supported on the fan shaft and defining a bypass flow ratio greater than about six. A frame supports the fan shaft. A gear system drives the fan shaft. The gear system has a gear reduction ratio of greater than or equal to about 2.3. A torque frame at least partially supports the gear system. An input is coupled to the gear system. A downstream turbine is coupled to rotatably drive the input coupling. The downstream turbine defines a pressure ratio that is greater than about five (5).

29 Claims, 3 Drawing Sheets

Related U.S. Application Data continuation of application No. 11/504,220, filed on Aug. 15, 2006, now Pat. No. 8,753,243.

(51) Int. Cl.
    *F02C 7/36*     (2006.01)
    *F16H 57/04*     (2010.01)

(52) U.S. Cl.
    CPC ...... *F05D 2220/36* (2013.01); *F05D 2240/70* (2013.01); *F05D 2260/34* (2013.01); *F05D 2260/4031* (2013.01); *F05D 2260/40311* (2013.01); *F16H 57/0479* (2013.01); *F16H 57/0486* (2013.01)

(56) References Cited

U.S. PATENT DOCUMENTS

| | | |
|---|---|---|
| 3,160,026 A | 12/1964 | Rosen |
| 3,287,906 A | 11/1966 | McCormick |
| 3,352,178 A | 11/1967 | Lindgren et al. |
| 3,722,323 A | 3/1973 | Welch |
| 3,747,343 A | 7/1973 | Rosen |
| 3,754,484 A | 8/1973 | Roberts |
| 3,892,358 A | 7/1975 | Gisslen |
| 4,130,872 A | 12/1978 | Harloff |
| 4,583,413 A | 4/1986 | Lack |
| 5,211,541 A | 5/1993 | Fledderjohn et al. |
| 5,302,031 A | 4/1994 | Yuasa |
| 5,391,125 A | 2/1995 | Turra et al. |
| 5,433,674 A | 7/1995 | Sheridan et al. |
| 5,447,411 A | 9/1995 | Curley et al. |
| 5,466,198 A | 11/1995 | McKibbin et al. |
| 5,472,383 A | 12/1995 | McKibbin |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,158,210 A | 12/2000 | Orlando |
| 6,223,616 B1 | 5/2001 | Sheridan |
| 6,318,070 B1 | 11/2001 | Rey et al. |
| 6,402,654 B1 | 6/2002 | Lanzon et al. |
| 6,530,858 B1 | 3/2003 | Uroso et al. |
| 6,669,597 B1 | 12/2003 | Uroso et al. |
| 6,732,502 B2 | 5/2004 | Seda et al. |
| 6,814,541 B2 | 11/2004 | Evans et al. |
| 7,021,042 B2 | 4/2006 | Law |
| 7,591,754 B2 | 9/2009 | Duong et al. |
| 7,662,059 B2 | 2/2010 | McCune |
| 7,704,178 B2 | 4/2010 | Sheridan et al. |
| 7,824,305 B2 | 11/2010 | Duong et al. |
| 7,926,260 B2 | 4/2011 | Sheridan et al. |
| 8,074,440 B2 | 12/2011 | Kohlenberg |
| 8,205,432 B2 | 6/2012 | Sheridan |
| 8,894,538 B2 * | 11/2014 | McCune ............... F01D 5/027 475/331 |
| 2002/0064327 A1 | 5/2002 | Toda et al. |
| 2004/0112041 A1 | 6/2004 | Law |
| 2005/0026745 A1 | 2/2005 | Mitrovic |
| 2008/0006018 A1 | 1/2008 | Sheridan et al. |
| 2008/0044276 A1 | 2/2008 | McCune et al. |
| 2008/0096714 A1 | 4/2008 | McCune |
| 2008/0116009 A1 | 5/2008 | Sheridan et al. |
| 2009/0053058 A1 | 2/2009 | Kohlenberg et al. |
| 2009/0056306 A1 | 3/2009 | Suciu et al. |
| 2009/0081039 A1 | 3/2009 | McCune et al. |
| 2009/0090096 A1 | 4/2009 | Sheridan |
| 2009/0111639 A1 | 4/2009 | Klingels |
| 2009/0293278 A1 | 12/2009 | Duong et al. |
| 2009/0298640 A1 | 12/2009 | Duong et al. |
| 2009/0314881 A1 | 12/2009 | Suciu et al. |
| 2010/0148396 A1 | 6/2010 | Xie et al. |
| 2010/0331139 A1 | 12/2010 | McCune |
| 2011/0130246 A1 | 6/2011 | McCune |
| 2012/0124964 A1 | 5/2012 | Hasel et al. |
| 2012/0275904 A1 | 11/2012 | McCune et al. |
| 2013/0023378 A1 | 1/2013 | McCune et al. |
| 2014/0154054 A1 | 6/2014 | Sheridan et al. |
| 2014/0230403 A1 | 8/2014 | Merry et al. |
| 2015/0065285 A1 | 3/2015 | McCune et al. |

FOREIGN PATENT DOCUMENTS

| | | |
|---|---|---|
| EP | 1876338 | 1/2008 |
| EP | 1890054 | 2/2008 |
| EP | 1925855 | 5/2008 |
| EP | 2224100 | 9/2010 |
| EP | 2559913 | 2/2013 |
| EP | 2610463 | 7/2013 |
| FR | 1357038 | 4/1964 |
| GB | 1516041 | 6/1978 |
| GB | 2041090 | 9/1980 |
| JP | 5248267 | 9/1993 |
| JP | 9317833 | 12/1997 |
| JP | 2001208146 | 8/2001 |
| JP | 3920031 | 5/2007 |
| JP | 2015137649 A | 7/2015 |
| WO | 2007038674 | 4/2007 |
| WO | 20130147951 | 10/2013 |
| WO | 2015017041 A1 | 2/2015 |

OTHER PUBLICATIONS

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

(56) References Cited

OTHER PUBLICATIONS

Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau K. Gu, C. and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
European Search Report for European Application No. 16183877.6 dated Jan. 5, 2017.
Petition for *Inter Partes* Review of U.S. Pat. No. 8,894,538. *General Electric Company*, Petitioner, v. *United Technologies Corporation*, Patent Owner. Filed Mar. 1, 2017.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Wilfert, G. (2008). Geared fan. Aero-Engine Design: From State of the Art Turbofans Towards Innovative Architectures, von Korman Institute for Fluid Dynamics, Belgium, Mar. 3-7, 2008. pp. 1-26.
European Search Report for European Application No. 16174068.3 dated Nov. 22, 2016.
Decision Institution of *Inter Partes* Review. *General Electric Company.*, Petitioner, v. *United Technologies Corp.*, Patent Owner. IPR2017-01001. U.S. Pat. No. 8,894,538. Entered Jul. 10, 2017. pp. 1-4.
The International Preliminary Report on Patentability for PCT Application No. PCT/US2012/071906, dated Jul. 24, 2014.
Meier, N (2005). Civil Turbojet/Turbofan Specifications. Retrieved from http://www.jet-engine.net/civtfspec.html.
Zalud, "Gears Put a New Spin on Turbofan Performance" Machine Design, Nov. 5, 1998, 2010Penton Media, Inc., 5 pp.
The European Search Report and Written Opinion for European Application No. EP 12198136, completed on Aug. 21, 2013.
The International Search Report and Written Opinion for International Application No. PCT/US2012/071906, completed on Aug. 22, 2013.
Kandebo; Geared-Turbofan Engine Design Targets Cost, Complexity, Aviation Week & Space Technology; New York; Feb. 23, 1998, 4 pp.
Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
Japanese Office Action for Japanese Application No. 2007-202444, dated Aug. 3, 2010.
European Search Report for EP Application No. 07253078.5, dated Dec. 5, 2007.
Notice of Opposition to Patent No. 2610463. United Technologies Corporation opposed by Safran Aircraft Engines, Mailed Aug. 3, 2016.
Extended European Search Report for European Application No. 16171476.1 dated Oct. 6, 2016.

(56) References Cited

OTHER PUBLICATIONS

European Search Report for European Patent Application No. 12198045.2 completed Sep. 7, 2015.

* cited by examiner

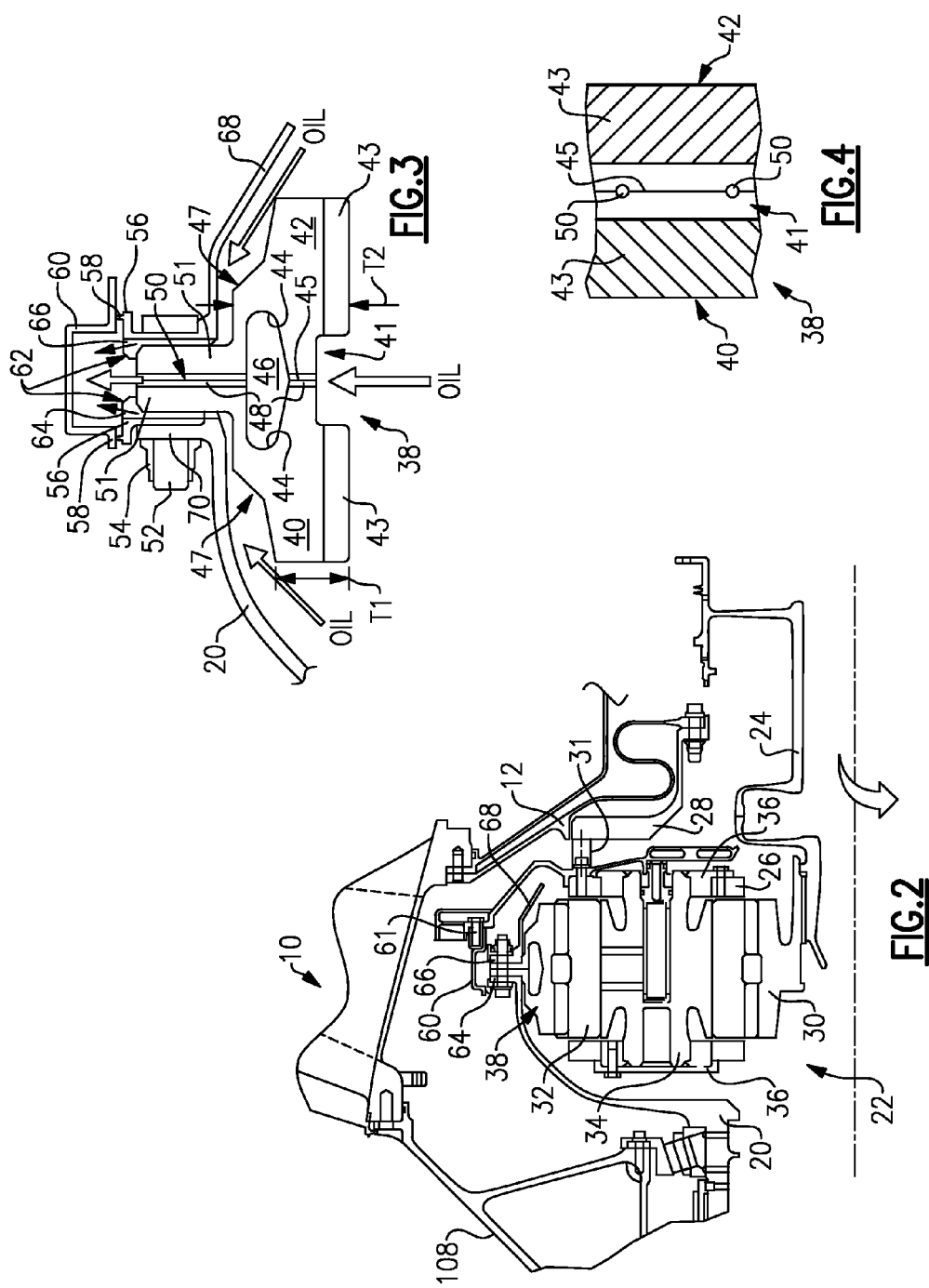

GAS TURBINE ENGINE WITH GEARED ARCHITECTURE

CROSS REFERENCE TO RELATED APPLICATIONS

The present disclosure is a continuation-in-part of U.S. patent application Ser. No. 13/346,120, filed Jan. 10, 2012, which was a continuation-in-part of U.S. patent application Ser. No. 11/504,220, filed Aug. 15, 2006, now U.S. Pat. No. 8,753,243, granted Jun. 17, 2014.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY

In a featured embodiment, a geared architecture for a gas turbine engine comprises a fan shaft and a fan supported on the fan shaft and defining a bypass flow ratio greater than about six. A frame supports the fan shaft. A gear system drives the fan shaft. The gear system has a gear reduction ratio of greater than or equal to about 2.3. A torque frame at least partially supports the gear system. An input is coupled to the gear system. A downstream turbine is coupled to rotatably drive the input coupling. The downstream turbine defines a pressure ratio that is greater than about five (5).

In another embodiment according to the previous embodiment, the frame and the torque frame are mounted to a fixed structure.

In another embodiment according to any of the previous embodiments, the frame and the torque frame are mounted to a front center body of a gas turbine engine.

In another embodiment according to any of the previous embodiments, the torque frame is mounted to a carrier of the gear system.

In another embodiment according to any of the previous embodiments, the input coupling is mounted to a sun gear of the gear system.

In another embodiment according to any of the previous embodiments, the fan shaft is mounted to a ring gear of the gear system.

In another embodiment according to any of the previous embodiments, the gear system is a star system.

In another embodiment according to any of the previous embodiments, the gear system is an epicyclic gear train.

In another embodiment according to any of the previous embodiments, the bypass flow ratio is greater than about ten (10).

In another embodiment according to any of the previous embodiments, the gear reduction ratio is greater than or equal to about 2.5.

In another embodiment according to any of the previous embodiments, the gear system includes a carrier supporting intermediate gears that mesh with a sun gear. A ring gear surrounds and meshes with the intermediate gears. Each of the intermediate gears is supported on a respective journal bearing.

In another embodiment according to any of the previous embodiments, the input coupling is coupled to the sun gear and the fan shaft is coupled to the ring gear.

In another embodiment according to any of the previous embodiments, there are three turbine rotors, with the downstream turbine being a most downstream of the three turbine rotors.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
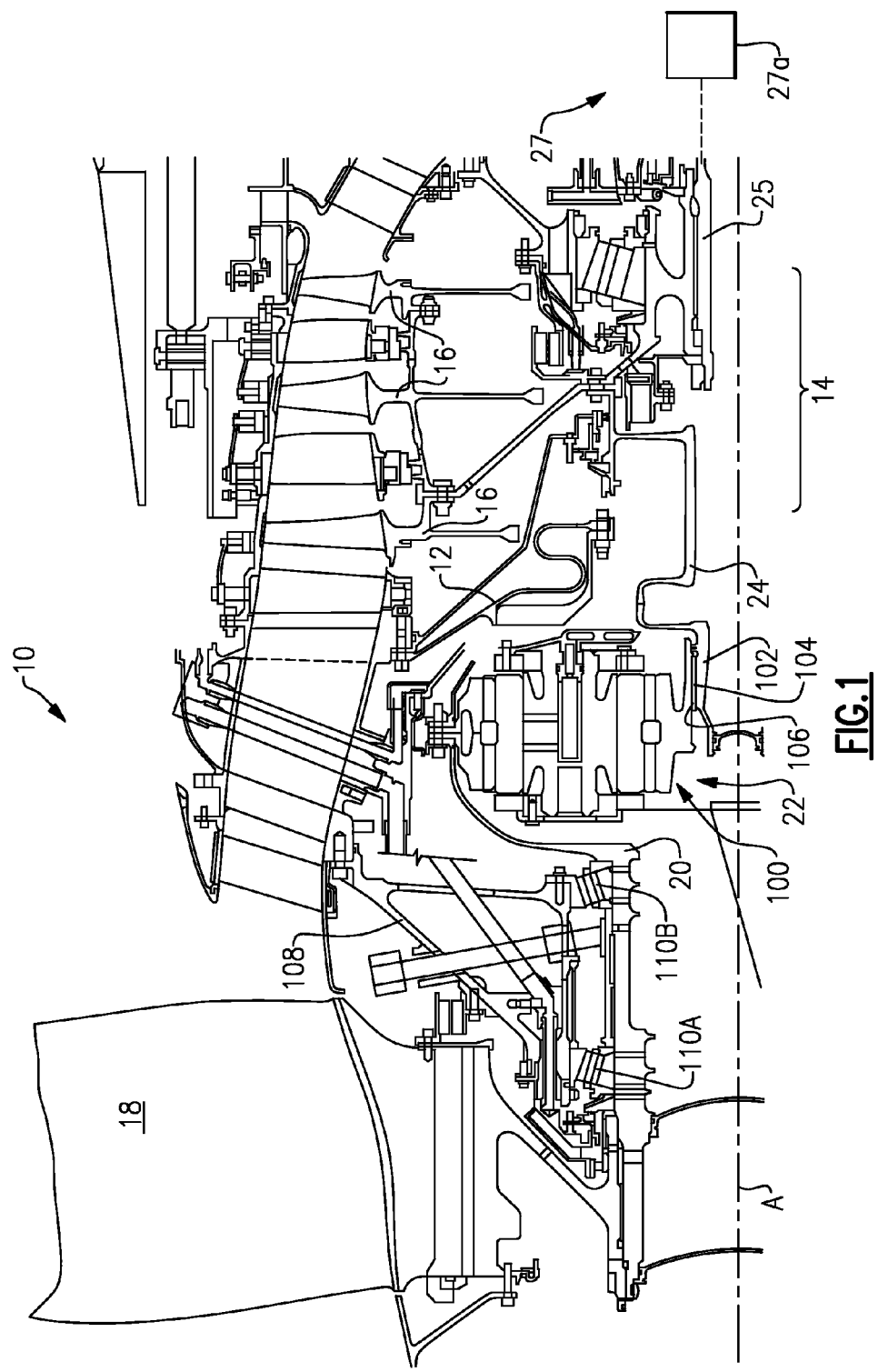
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22. The engine 10 is a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. The engine 10 in one non-limiting embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 27a (shown schematically) has a pressure ratio that is greater than 5:1. As understood, the low pressure turbine 27a is downstream of at least one upstream, or high pressure turbine. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of 1 bm of fuel being burned divided by 1 bf of thrust the engine produces at that minimum point. "Low fan pressure ratio" is the pressure ratio across the fan blade alone, without the FEGV system 36. The low fan pressure ratio as disclosed herein according to one non-limiting embodiment is less than 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than 1150 ft/second.

The gear train 22 generally includes a fan drive gear system (FDGS) 100 driven by the compressor shaft 24 through an input coupling 102. The input coupling 102 both transfers torque from the compressor shaft 24 to the gear train 22 and facilitates the segregation of vibrations and other transients therebetween.

The input coupling 102 may include an interface spline 102 joined, by a gear spline 106, to the sun gear 30. The sun gear 30 is in meshed engagement with multiple star gears 32. Each star gear 32 is also in meshed engagement with rotating ring gear 38 that is mechanically connected to the fan shaft 20. Since the star gears 32 mesh with both the rotating ring gear 38 as well as the rotating sun gear 30, the star gears 32 rotate about their own axes to drive the ring gear 38. The rotation of the ring gear 38 is conveyed to the fan 20 through the fan shaft 20 to thereby drive the fan 18 at a lower speed than the turbine shaft 25.

In the example arrangement shown, the epicyclic gear train 22 is a star gear train. Referring to FIG. 2, the epicyclic gear train 22 includes the sun gear 30 that is connected to the compressor shaft 24, which provides rotational input, by the splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

The torque frame 28 supports the carrier 26 with respect to the housing 12 such as a front center body which facilitates the segregation of vibrations and other transients therebetween. It should be understood that various gas turbine engine case structures may alternatively or additionally be provided.

The fixed housing 12 may further include a number 1 and 1.5 bearing support frame 108 which is commonly referred to as a "K-frame" which supports the number 1 and number 1.5 bearing systems 110A, 110B to support the fan shaft 20 (FIG. 1). The number 1 and number 1.5 bearing systems 110A, 110B may include tapered roller bearings which provide a line contact.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Figure 5:
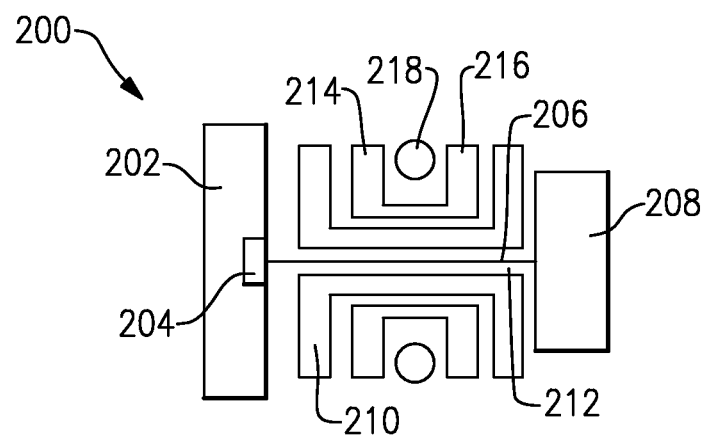
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
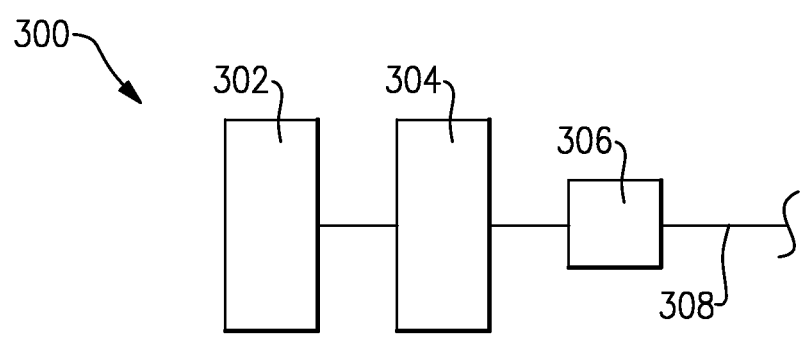
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan shaft and a fan supported on said fan shaft;
   an epicyclic gear system which drives said fan shaft, said gear system comprising:
      a carrier supporting intermediate gears that mesh with a sun gear; and
      a ring gear surrounding and meshing with said intermediate gears, said ring gear including first and second portions each having an inner periphery with teeth, said first and second portions abutting one another at a radial interface, each of said first and second portions including a flange extending radially outward, and said flange secured to said fan shaft, and said first and second portions having grooves at said radial interface which forms a hole that expels oil through said ring gear to a gutter; and
   a torque frame which at least partially supports said gear system.

2. The gas turbine engine as recited in claim 1, further comprising a compressor shaft which drives said fan shaft through said gear system, said compressor shaft connected to said sun gear.

3. The gas turbine engine as recited in claim 2, wherein each of said intermediate gears are supported on a respective journal bearing.

4. The gas turbine engine of claim 3, wherein said fan shaft includes a radially extending flange that is secured to said flange of each of said first and second portions.

5. The gas turbine engine as recited in claim 4, wherein said flange of each of said first and second portions is fixed to said fan shaft by a fastening element.

6. The gas turbine engine as recited in claim 4, further comprising a compressor having three compressor hubs each with blades, said compressor hubs supported by said compressor shaft.

7. The gas turbine engine as recited in claim 6, wherein said sun gear is connected to said compressor shaft by a splined connection.

8. The gas turbine engine as recited in claim 7, further comprising a bypass flow ratio of greater than 10.

9. The gas turbine engine as recited in claim 8, further comprising a fan pressure ratio of less than 1.45.

10. The gas turbine engine as recited in claim 9, wherein said gear system has a gear reduction ratio of greater than 2.3.

11. The gas turbine engine as recited in claim 9, further comprising a low pressure turbine having a pressure ratio of greater than 5:1.

12. The gas turbine engine as recited in claim 11, wherein said gear system has a gear reduction ratio of greater than 2.5.

13. The gas turbine engine as recited in claim 12, wherein said low pressure turbine is downstream of at least one turbine.

14. The gas turbine engine as recited in claim 12, further comprising an input coupling that is coupled to said sun gear, wherein said input coupling transfers torque from said compressor shaft and facilitates segregation of vibrations between said compressor shaft and said gear system.

15. The gas turbine engine as recited in claim 14, wherein said input coupling includes a splined connection joined to said sun gear.

16. The gas turbine engine as recited in claim 12, said torque frame is mounted to a front center body, and a housing includes a bearing support frame supporting bearing systems, said bearing systems supporting said fan shaft.

17. The gas turbine engine as recited in claim 16, wherein said bearing systems include tapered roller bearings.

18. The gas turbine engine as recited in claim 16, wherein said low pressure turbine is downstream of at least one turbine.

19. The gas turbine engine as recited in claim 18, wherein said gear system is intermediate a compressor rotor and a shaft driven by said low pressure turbine such that said fan shaft and said compressor rotor are rotatable at a common speed.

20. The gas turbine engine of claim 6, wherein said first and second portions each have a generally S-shaped outer circumferential surface that provide a first thickness and a second thickness axially inward from said first thickness, said second thickness greater than said first thickness.

21. The gas turbine engine as recited in claim 6, wherein said carrier is fixed to a housing by said torque frame.

22. The gas turbine engine of claim 21, wherein said gutter is secured to said carrier.

23. The gas turbine engine of claim 21, wherein said first and second portions include facing recesses that form an annular cavity, said teeth are oppositely angled teeth on each of said first and second portions which mesh with complementary oppositely facing teeth on said intermediary gears, and a trough separates said oppositely angled teeth.

24. The gas turbine engine of claim 21, further comprising a first seal and a second seal each secured to a respective one of said flange or said radially extending flange.

25. The gas turbine engine of claim 24, wherein each of said first and second seals includes an oil return passage that drains oil on a respective side of said ring gear into said gutter.

26. The gas turbine engine of claim 25, wherein said oil return passage is provided by a slot.

27. The gas turbine engine of claim 26, wherein said slot is a first slot and a second slot each located in a respective one of said first and second seals.

28. The gas turbine engine of claim 26, wherein said slot is located in said radially extending flange of said fan shaft.

29. The gas turbine engine of claim 26, wherein said first and second seals include knife edges formed from a first material, and said gutter is formed from a second material that is relatively softer than said first material such that said knife edges cut into said gutter in response to interference between said knife edges and said gutter.

* * * * *